United States Patent Office 3,496,236
Patented Feb. 17, 1970

3,496,236
EQUILIBRATION OF POLY-(1,4-PHENYLENE ETHERS)
Glenn D. Cooper, Pittsfield, Mass., and Alfred R. Gilbert, Schenectady, N.Y., assignors to General Electric Company, a corporation of New York
No Drawing. Filed May 3, 1966, Ser. No. 547,180
Int. Cl. C07c *43/20, 41/00;* C08f *3/34*
U.S. Cl. 260—613         7 Claims

ABSTRACT OF THE DISCLOSURE

Poly - (1,4-phenylene ethers) are equilibrated with phenols which may be the same or different phenol than that from which the polyphenylene ether is made, to produce lower molecular weight of the polymers than the starting polyphenylene ether. The degree to which the molecular weight is decreased is dependent on the amount of phenol equilibrated with the polymer.

---

This inventon relates to the equilibration of one or more poly - (1,4-phenylene ethers) with one or more phenols in the presence of an aryloxy radical of the polymer, the phenol or both the polymer and phenol whereby the phenol reacts with the poly-(1,4-phenylene ether) producing dimers, trimers, tetramers and other low molecular weight oligomers of the starting poly-(1,4-phenylene ether), with the molecular weight of the polymer which reacts with the phenol being decreased in proportion to the degree of reaction with the phenol. In this reaction, the phenol is incorporated into the oligomeric products as the terminal phenoxy group, or tail unit, of the molecule, with the balance of the molecule being one or more phenoxy units that are the repeating unit of the starting poly-(1,4-phenylene ether) with the terminal or head unit having a hydroxyl group in place of the ether oxygen of the other units.

Polyphenylene ethers, as a class, form an interesting group of new polymers covered by a copending application of A. S. Hay, Ser. No. 212,128, filed July 20, 1962, now U.S. Patent 3,306,875 as a continuation-in-part of previously filed applications and assigned to the same assignee as the present invention.

These polymers were first described in publications by Hay and co-workers in the J. Amer. Chem. Soc. 81, 6335 (1959) and in more detail in the later series of articles appearing in J. Polymer Science, 58, 581–609 (1962). These poly-(1,4-phenylene ethers) are made by an oxidative coupling reaction of various phenols in which the hydrogen of the phenolic group and the hydrogen or halogen on the benzene ring are removed in forming the poly-(1,4-phenylene ethers). The most desirable poly-(1,4-phenylene ethers) are made from 2,6-di-substituted phenols. They are linear polymers joined through the 1 and 4 position, with each unit of the polymer molecule being joined to the adjacent unit through the oxygen of the phenolic hydroxyl group. In a copending application of Hay, Ser. No. 593,733, filed Nov. 14, 1966 and now Patent No. 3,432,466 and assigned to the same assignee as the present invention, another method is disclosed for the oxidative coupling of 2,6-diaryl-substituted phenols to form poly-(2,6-diaryl-1,4-phenylene ethers).

Previous to Hay's discovery of this oxidative coupling reaction, low molecular weight poly - (1,4-phenylene ethers) having from 2 to 8 repeating units in the polymer molecule, had been prepared by an Ullmann reaction which involves first converting the phenol to an ether such as the methyl ether, followed by halogenation of the p-position and thereafter, reacting the p-halophenyl methyl ether with an alkali metal salt of the phenol in the presence of copper metal as a catalyst. This would lead to a p-phenoxyphenyl methyl ether. For each additional unit added in the polymer chain, it is necessary to demethylate the ether to form the free phenol, and then convert it to an alkali metal salt, followed by reaction with an additional amount of the p-halophenyl methyl ether. However, after about eight units are so connected in the polymer chain, further reaction to higher molecular weight materials is extremely difficult, if not impossible.

The Hay process, on the other hand, is so extremely fast that any attempt to produce the low moleculuar weight oligomers having less than ten repeating units in the polymer molecule is only posible by stopping the reaction at such an early stage that only a small percentage of the starting phenol is converted to polymer, whereas the reaction is capable of converting essentially all of the starting phenol to high molecular weight polymer.

These low molecular weight or oligomeric phenylene ethers are of interest as starting chemicals for the making of a wide host of products. Materials which are thyroxine analogs can be prepared from the dimer. These oligomers also can be converted to esters. The oligomers or their esters can be used as plasticizers for the higher molecular weight polyphenylene ethers to increase their flexibility and flow properties, etc., as disclosed and claimed in Gowan application Ser. No. 528,779, filed Feb. 21, 1966 and assigned to the same assignee as the present invention.

As explained above, these materials have been capable of being prepared up to now only by the Ullmann reaction. However, this reaction is a step-wise and therefore, time-consuming as well as expensive reaction to carry out either in the laboratory or commercially.

Furthermore, because of the nature of the reaction, it is impossible to prepare even the dimers having certain substituents, for example, halogen in the p-position of the terminal phenoxy group. Such a compound would require the use of the alkali metal salt of a p-halophenol which is capable of undergoing self-condensation during the Ullmann reaction so that a host of products are obtained. Halogenation of the dimer, even when the two positions, ortho to the phenolic ether are substituted, for example, with an alkyl group does not lead to halogenation of the para-position of the benzene ring of the phenoxy group in the para-position of the phenol nucleus, but instead enters into the meta-position of the benzene ring, bearing the phenolic group.

We have now found when a poly-(1,4-phenylene ether) and a phenol are mixed together, that a reaction may be initiated by a phenoxy radical of the phenol, the polymer or both the phenol and the polymer, whereby the poly-(1,4-phenylene ether) is decreased in molecular weight in proportion to the degree of reaction with the phenol. It appears that the phenol reacts with the polymer molecule at the position on the benzene ring of the head unit para to the hydroxyl group in a free radical-type reaction initiated by the phenoxy radical.

During the equilibration, both the aryloxy radical of the phenol and the polyphenylene ether are formed as transient intermediates in the free radical reaction which occurs. Therefore, it does not matter whether the phenoxy radical of the phenol, the polymer or both are first formed. When a stable free radical, for example, 2,4,6-tri-t-butylphenoxy is added to the solution of the phenol and polyphenylene ether, the intense blue color of the 2,4,6-tri-t-butylphenoxy radical is immediately discharged showing that this radical has generated the aryloxy radical of one or both of the reactants. Once the equilibrium reaction is initiated, it proceeds until an equilibrium concentration of the various oligomers is attained, provided that the free radical reaction is not terminated before equilibrium is attained.

This reaction probably forms a quinol ether which decomposes to form a polymer molecule, one repeating unit shorter than the starting polymer molecule, and a dimer in which the "head" unit, i.e., the phenylene unit containing the hydroxyl group is that of the polyphenylene ether and the phenoxy group or "tail" unit of the dimer is that of the phenol.

This dimer, so produced, can likewise react with the polyphenylene ether in the same fashion as the initial phenol to produce a trimer, which in turn can react with the polyphenylene ether to form a tetramer, etc. Each reaction with the polymer shortens its chain length by one repeating unit. Once formed, the dimer, trimer, tetramer, etc., oligomers can react in dimer with dimer, dimer with trimer, dimer with tetramer, phenol with trimer, trimer with trimer, trimer with tetramer, etc., reactions. When the reaction mixture has come to equilibrium, the dimer usually is the dominant oligomeric product on a weight basis. Generally, the dimer will be formed in an amount of about 1½ to 2 times the weight of trimer and about 2 to 6 times the weight of tetramer. However, these ratios will depend upon the proportion of the amount of phenol to the amount of polyphenylene ether, the particular phenol used and also, on the molecular weight of the polyphenylene ether. Some higher molecular weight polyphenylene ether may also be present in the reaction mixture. The remaining polymer can be precipitated to separate it from the oligomers. The oligomers can be separated as individual components as will be explained later. By the term "oligomer" is meant a polymer molecule having only a few monomer units, for example, 2, 3, 4, etc. which are generally referred to as dimers, trimers, tetramers, etc. These oligomers have molecular weights generally no greater than 1500, but as is self-evident, this is dependent upon the molecular weight of the repeating polymer unit. Henceforth, the term "oligomer" will be used to designate these low molecular weight polymers which are products of the equilibration reaction and the term "polymer" will be used to designate the poly-(1,4-phenylene ethers) used as starting material and any residual high molecular weight poly-(1,4-phenylene ethers) remaining in the reaction mixture after the equilibration.

This equilibration reaction is apparently limited to polyphenylene ethers which are poly-(1,4-phenylene ethers), i.e., they are essentially linear in nature and have a hydroxyl group in the head unit. These polyphenylene ethers have the formula:

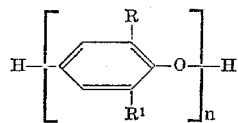

From a practical point of view, $n$ is at least 10 since this represents the polyphenylene ethers which are obtained when a high yield of polymer, based on the amount of phenol starting material, is obtained in the oxidative coupling reaction. In the formula, R is selected from the group consisting of $C_{1-8}$ alkyl free of an aliphatic, tertiary $\alpha$-carbon atom and phenyl, $R^1$ is the same as R and in addition, biphenyl, terphenylyl and naphthyl. If desired, polyphenylene ethers, where R and $R^1$ represents alkyl groups greater than eight carbon atoms, can also be equilibrated, but from a practical standpoint, the polyphenylene ethers represented by the above formula are those most readily available. Not all phenols can be equilibrated with the above polyphenylene ethers. The phenols which can be used are those phenols having one of the following three formulae:

(a)

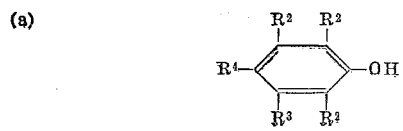

(b)

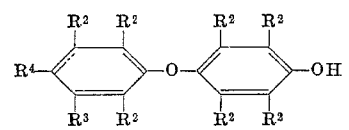

(c)

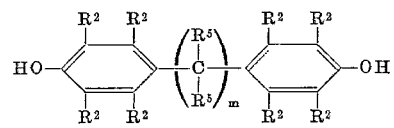

where $m$ is one of the numbers 0 and 1, each $R^2$ is independently selected from the group consisting of hydrogen, $C_{1-8}$ alkyl free of an aliphatic, tertiary $\alpha$-carbon atom, phenyl and halogen, $R^3$ is the same as $R^2$ and in addition hydroxyl, $R^4$ is selected from the group consisting of hydrogen, $C_{1-8}$ alkyl, $C_{1-8}$ alkoxy, $C_{1-8}$ acyl, and phenyl, and in addition, halogen when each $R^2$ on the same benzene ring as $R^4$, is one of the members consisting of hydrogen and halogen, $R^5$ is selected from the group consisting of hydrogen, methyl, ethyl and phenyl.

Typical examples of $C_{1-8}$ alkyl groups free of an aliphatic, tertiary $\alpha$-carbon atom which R and $R^1$ and $R^2$, may be are methyl, ethyl, n-propyl, isopropyl, n-butyl, secondary butyl (1-methylpropyl), isobutyl (2-methylpropyl), cyclobutyl, the various amyl isomers free of an aliphatic, tertiary $\alpha$-carbon atom, cyclopentyl, the various hexyl isomers free of an aliphatic, tertiary $\alpha$-carbon atom, cyclohexyl, methylcyclohexyl, dimethylcyclohexyl, ethylcyclohexyl, the various heptyl isomers free of an aliphatic, tertiary $\alpha$-carbon atom, the various octyl isomers free of an aliphatic, tertiary $\alpha$-carbon atom, etc.

The term "free of an aliphatic, tertiary $\alpha$-carbon atom" means that the terminal carbon atom of the alkyl substituent which is attached to the phenyl nucleus has at least 1 hydrogen atom attached to it.

The biphenylyl represented by $R^1$ may be ortho, meta, or para-biphenylyl and the terphenylyl may be any of the isomeric terphenylyls, for example, o-terphenylyl, m-terphenylyl, and p-terphenylyl, which alternatively may be named as diphenyl-substituted phenyls, for example, 2,3-diphenylphenyl, 2,4-diphenylphenyl, 2,5-diphenylphenyl, 2,6 - diphenylphenyl, 3,4 - diphenylphenyl, 3,5-diphenylphenyl, 2-(o-biphenyl)phenyl, 2-(m-biphenyl)phenyl, 2-(p - biphenyl)phenyl, 3 - (o - biphenyl)phenyl, etc. The naphthyl may be either $\alpha$- or $\beta$-naphthyl.

The halogen which $R^2$, $R^3$ and $R^4$ represent, may be fluorine, chlorine, bromine or iodine, preferably chlorine or bromine since they are the least expensive and most readily available.

It is to be noted that $R^4$ may be any $C_{1-8}$ alkyl, including those having an aliphatic, tertiary $\alpha$-carbon atom. In addition to the $C_{1-8}$ alkyls given above, $R^4$, in addition, may be t-butyl, 2-methyl-2-butyl-(1,1-dimethyl-propyl), 2 - methyl - 2 - butyl, 2-ethyl-2-butyl, 2-methyl-2-pentyl, 3-methyl-3-heptyl, etc. The $C_{1-8}$ alkoxy may be the same as the alkyl group except that they are joined to the phenyl nucleus through an oxygen group, for example, methoxy, ethoxy, n-propoxy, isopropoxy, t-butoxy, the various isomeric pentoxy groups, various isomeric hexoxy groups, including cyclohexoxy, the various isomeric heptoxy groups, the various isomeric octoxy groups, etc.

Typical examples of the acyloxy groups which $R^4$ may be are acetoxy, propionyloxy, the various isomeric butanoyloxy groups, the various isomeric pentanoyloxy groups, the various hexanoyloxy groups, including cyclohexanoyloxy, the various isomeric heptanoyloxy groups, and various isomeric octanoyloxy groups, benzoyloxy, toluoyloxy, phenylacetoxy, etc. The various acyl groups may be substituted, if desired, with a halogen atom, e.g., chloroacetoxy, bromoacetoxy, iodoacetoxy, fluoroacetoxy, chlorobenzoyloxy, etc.

The reaction between the phenol and polyphenylene ether is initiated by an aryloxy radical, i.e., a free radical.

This aryloxy radical may be either the phenoxy radical of the phenol, the phenoxy radical of the polyphenylene ether, or a mixture of both, wherein the hydrogen is removed from the phenolic hydroxyl group. These phenoxy radicals are created in various ways. They may be generated by adding a stable free radical to the solution which reacts with the phenol or polyphenylene ether to create a phenoxy radical, or the phenoxy radical may be generated in situ by use of an oxidizing agent capable of creating the phenoxy radical or the phenoxy radical may be created by exposure of the reaction mixture to actinic radiation in the presence of oxygen. The reaction is carried out in a solvent in which both the phenol and poly-(1,4-phenylene ether) are soluble and which will be inert under the reaction conditions. Liquid aromatic hydrocarbons are ideally suited as solvents for the reaction, for example, benzene, toluene, xylene, etc.

The reaction proceeds at ambient room temperature conditions, but is hastened by heating so that temperature up to the reflux temperature of the reaction mixture may be used. Generally, no advantage is gained by use of subatmospheric or superatmospheric pressure, but may be used if desired. As will be demonstrated in the specific examples, the activity of the various phenols in the equilibration reaction varies among phenols. Therefore, longer times of reaction or higher temperatures are required for those phenols with lower activity to obtain the equilibrated mixture. However, the progress of the reaction is easily ascertained by withdrawing a small sample, precipitating any polymer present by pouring into methanol and thereafter silylating the filtrate and determining its vapor-phase chromatograph. When two consecutive chromatographs are the same, then the maximum amount of equilibration has been obtained. In some cases, addition of more initiator for the aryloxy radical may cause further equilibration of the reaction mixture, especially if some impurity was present which may have stopped the equilibration reaction before true equilibrium was established.

Typical examples of free radicals which may be used to initiate the equilibration reaction between the phenol and polyphenylene are: tri-t-butylphenoxy, diphenyl-picrylhydrazyl, the free radical known as galvanoxyl, which is 2,6-di-t-butyl-α-(3,5-di-t-butyl-4-oxo-2,5-cyclohexadiene 1-ylidene)-p-tolyloxy, triphenylimidazyl, tetraphenylpyrryl, etc. These free radicals are highly colored, but when they are added to the reaction mixture of the phenol and polyphenylene ether, the color is immediately discharged due to the formation of the desired phenoxy radical. The above free radicals are extremely easy to prepare and therefore, readily available. For example, the stable 2,4,6-tri-t-butylphenoxy free radical is readily prepared by treating a solution of 2,4,4-tri-t-butylphenol in an inert hydrocarbon solvent with an oxidizing agent such as peroxide, potassium ferricyanide, etc. This radical is extremely stable and can be kept for long perids of time in solution or can actually be isolated as a solid. However, it should be kept out of contact with oxygen. One means of stabilizing solutions of this free radical is to add a phenol such as 4-t-butylphenol which reacts with the free radical to produce 4-(4-t-butylphenoxy)-2,4,6-tri-t-butyl-2,5-cyclohexadienone. When gently heated the 2,4,6-tri-t-butylphenoxy radical is regenerated from this compound. Other free radicals that we may use may be any of the known free radicals which are capable of generating the aryloxy radicals, as evidence by discharge of their color when added to the reaction mixture.

The aryloxy radicals may likewise be generated in situ by use of peroxides. The particular peroxides chosen should be one which will decompose at the particular temperature that is to be used in carrying out the equilibration reaction. Because it is readily available and satisfactory for our process, we generally use benzoyl peroxide, t-butyl perbenzoate, etc., if the aryloxy radical is to be generated with a peroxide. However, other peroxides having suitable decomposition temperatures can be used if desired.

Likewise, the aryloxy radicals may be generated by irradiating the reaction mixture in the presence of oxygen with actinic light. The effectiveness of the actinic light is dependent upon it being absorbed by the phenol. Generally, phenols absorb most strongly in the ultraviolet region. However, due to the low quantum yield, the irradiation must be continued during the entire equilibration reaction, whereas initiation by the use of other materials capable of generating aryloxy radicals need only to be done at the start of the equilibration reaction. For these reasons, we prefer to use means other than the irradiation with actinic irradiation, as a means for generating the aryloxy radicals. However, it can be used if desired.

Aryloxy radicals may also be generated by use of diphenoquinones which are readily prepared by the oxidative coupling of the corresponding phenol, for example, as disclosed in U.S. 3,210,384—Hay. The particular diphenoquinones that are especially useful in generating aryloxy radicals are those 3,3',5,5'-tetrasubstituted diphenoquinones wherein the substituents are either alkyl groups free of an aliphatic, tertiary α-carbon atom or aryl. When the alkyl groups contain an aliphatic, tertiary α-carbon atom, the substituents are so large and bulky that they greatly inhibit, if not prevent, the quinone group from generating the aryloxy radical. Other materials which we have found useful to generate the aryloxy radical are the dipyridyl complex of cupric salts, preferably used in the absence of excess pyridine, the compound known as "methanol green" having the empirical formula

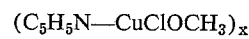

$$(C_5H_5N-CuClOCH_3)_x$$

and the dipyridyl complex of cupric trichlorophenate. The latter two compounds and method of making are described in J. Polymer Science, 58, 469–490 (1962), and are covered by copending application Ser. No. 425,-995, now U.S. Patent 3,277,095, filed Dec. 22, 1964 and Ser. No. 510,415, now U.S. Patent 3,310,562 filed Sept. 2, 1965, as divisions of prior applications and both assigned to the same assignee as the present invention.

When the tetra-substituted diphenoquinones are used for generating the aryloxy radicals, a secondary beneficial effect is obtained by their use which is not noticed when the other methods discussed above are used for generating the aryloxy initiator. This effect is noticed when polyphenylene ethers are used in the equilibration reaction which have intrinsic viscosities greater than about 0.4 and especially those having intrinsic viscosities greater than 0.6 measured in chloroform at 25° C.

During the initial polymerization reaction for making of the polyphenylene ethers, the reaction appears to be a straightforward formation of a linear polymer with an OH terminal group on one end of the polymer molecule, as would be expected. During the latter stage of the oxiditive coupling polymerization reaction, apparently some of the polymer molecules, but not all, lose this terminal hydroxy group in some, as yet unknown, termination reaction. Those polymer molecules which are terminated with a hydroxyl group readily enter into equilibration with the phenols in the presence of the phenoxy radical initiator, whereas the other polymeric molecules, which are not so terminated, apparently do not. Since the presence of an OH group would be necessary to form the phenoxy radical of the polymers, this indicates that such formation is part of the overall equilibration reaction.

The diphenoquinones have the ability to react with such polymer molecules in some fashion to convert at least part of the molecule to a form which also readily equilibrates with the phenol. We have determined that the diphenoquinones in the absence of any of the phenol reactants, decrease the molecular weight of the polymer as shown by a decrease in intrinsic viscosity of the polymer Therefore, by using diphenoquinones to produce the phenoxy radical, a higher yield of oligomers and a lower yield of residual polymer will be obtained when the higher molecular weight polyphenylene ethers are used as the starting material in the equilibration reaction.

As a corollary to this, when a complete conversion of the polyphenylene ether to the oligomers is desired, we prefer to use as a starting polyphenylene ether, for the equilibration reaction, those polyphenylene ethers which have intrinsic viscosities in the range of 0.05 to 0.3, and preferably, in the range of 0.1 to 0.2. By using such polyphenylene ethers, a complete conversion of the polymer to oligomers can be obtained during the equilibration reaction regardless of what initiator is used to produce the aryloxy radicals.

In producing aryloxy radical by whatever means, i.e., the use of peroxides, use of diphenoquinones, or use of stable free radicals, the degree of equilibration which will be obtained generally is dependent upon the amount and type of initiator used to produce the aryloxy radicals. To obtain a high yield of oligomers, the amount of aryloxy radical should be generally in the range of 1 to 10 mole percent of the amount of phenol used. No benefit is obtained by use of a larger quantity, whereas the use of a lower amount has the effect of increasing the time needed to produce a given amount of equilibration between the phenol and the polyphenylene ethers. However, lower or higher amounts may be used if desired.

Likewise, the amount of the equilibration that is obtained will be dependent upon the ratio of the moles of phenol used per mole of polymer units in the polyphenylene ether, i.e., if the phenol used is 2,6-dimethylphenol and the polyphenylene ether is poly-(2,6-dimethyl-1,4-phenylene ether), then regardless of the molecular weight of the polyphenylene ether, an equal weigt of the phenol and an equal weight of the polyphenylene ether will give a ratio of 1 mole of the phenol to 1 mole of the polyphenylene repeating units in the polyphenylene ether. If the repeating polymeric unit has a larger unit molecular weight than the phenol used, an equal molar mixture would be obtained by using weights of these two materials in direct portion to the molecular weight of the phenol and the unit molecular weight of the repeating unit of the polymer, i.e., the sum of the atomic weights of the atoms in the repeating unit. By way of example, a a poly-(2,6-dimethyl-1,4-phenylene ether) having a theoretical molecular weight of 12,002, has 100 repeating 2,6-dimethyl-1,4-phenoxy units having a unit molecular weight of 120 with a hydrogen on the terminal oxygen forming a hydroxyl group. One mole of polymer unit would, therefore, be 120 grams of the polymer and this would be independent of the molecular weight of the polymer molecule.

If the objective in carrying out the equilibration reaction is to produce a large yield of the oligomers, the ratio of the phenol to the polyphenylene ether should be at least 1 mole of phenol per mole of polymer unit in the polymer molecule and preferably, greater than 1 mole. On the other hand, if the objective of the equilibration reaction is to decrease the intrinsic viscosity of a polymer, i.e., to decrease its molecular weight, then one would want to obtain a high yield of polymer. In this case, the ratio of phenol to polyphenylene ether should be less than one mole of phenol per mole of polymer unit with the ratio being dependent upon the desired degree of equilibration. The lower the ratio of moles of phenol to moles of polyphenylene ether units of a polymer which can be completely converted to oligomers, i.e., the polymer molecules are all poly(1,4-phenylene ether) molecules having OH on the head unit, the nearer the intrinsic viscosity polyphenylene ether product obtained from the equilibration reaction will approach that of the starting polyphenylene ether.

After the desired degree of equilibration has been attained, isolation of the oligomers is facilitated by extracting as much phenol as possible, if the oligomers are not soluble, by extracting the reaction mixture with aqueous alkali, e.g., sodium or potassium hydroxide, etc., followed by an acid wash and a water wash. This is not necessary, but it does reduce the amount of silylating or acylating agent required to stabilize the reaction mixture for isolating the individual oligomers. If the reaction mixture contains polymer, as determined by a previous run or by test on a sample, the reaction mixture is mixed with a liquid which is non-solvent for the polymer but is a solvent for the oligomers. The lower alkyl alcohols, e.g., methyl, ethyl, propyl, butyl, hexyl, octyl, etc. alcohols, are ideal precipitating liquids with methyl and ethyl alcohol being preferred because of their low cost and availability and excellent precipitating properties.

Enough of the precipitating liquid is added to overcome the ability of the solvent in the reaction mixture to retain any high molecular weight polymer in solution. The precipitating liquid can be added to the reaction mixture or vice versa. Generally a volume of precipitating liquid which is two to three times the volume of the reaction mixture is sufficient. To reduce the amount of precipitating liquid required, the volume of the reaction mixture can be reduced by evaporation of some of the solvent either by distillation at the end of the equilibration reaction, especially if carried out at the reflux temperature, or under reduced pressure sufficient to cause the solvent to distill, if a lower distillation temperature is desired.

If the concentration step follows the alkali extraction step, it is preferable that the concentration step be performed at or below ambient temperature, if it is desired, to suppress further equilibration in the reaction mixture. Further equilibration will produce some of the starting phenol due to interaction of the dimer molecules producing monomer and trimer, which further upsets the previously established equilibrium due to the change in dimer concentration, etc.

To suppress this shifting of the equilibrium during isolation of the oligomers, the oligomers may be converted either to silyl ethers or to esters which prevents further change in the make-up of the equilibrium mixture. The solution of the ethers or esters so produced can be distilled to isolate the individual components. Since the silyl ethers are readily hydrolyzed at room temperature with water containing a trace of mineral acid, to regenerate the oligomer, they are a convient intermediate to form when the individual oligomers are the desired product. The esters may be isolated either as the individual esters or as a mixture and used as such as plasticizers for polymers, especially polyphenylene ethers.

The silylating agent is preferably monofunctional, i.e., the silyl group has only one group which is replaced during the silylating reaction. Typical examples are the trialkylsilyl halides, triarylsilyl halides, dialkyl arylsilylhalides, alkyl diarylsilyl haides, and compounds having the formula:

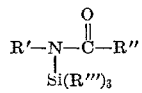

where R′, R″ and R‴ are monovalent hydrocarbon radicals, R′ is in addition hydrogen and the —Si(R‴)₃ radical and R″ in addition is hydrogen and the

radical, where Z is selected from the class consisting of hydrogen, monovalent hydrocarbon radicals, ard the aforesaid —Si(R‴)₃ group, with R‴ having the meaning above, and thereafter obtaining a compound whose acidic proton (hydrogen) is substituted with a —Si(R‴)₃ group.

Among the monovalent hydrocarbon radicals which R′, R″, R‴ and Z in Formula I may be are, for instance, alkyl radicals (e.g., methyl, ethyl, propyl, isopropyl, pentyl, octyl, dodecyl, etc., radicals); alkenyl radicals (e.g., vinyl, allyl, crotyl, etc., radicals); aryl radicals (e.g., phenyl, naphthyl, biphenyl, etc., radicals); aralkyl radicals (e.g., benzyl, phenylethyl, etc., radicals); alkaryl radicals (e.g., xylyl, tolyl, ethylphenyl, methylnaphthyl, etc., radicals); cycloaliphatic (including unsaturated) radicals (e.g., cyclopentyl, cyclohexyl, cyclopentenyl, cyclohexenyl, etc., radicals); etc.

The preparation and use of these compounds as silylating agents are disclosed and claimed in an application of Klebe, Ser. No. 398,781, filed Sept. 23, 1964, now U.S. 3,397,220 and assigned to the same assignee as the present invention.

Bifunctional silylating agents can be used but would produce compounds having higher boiling points which would increase the temperature required for distillation. Since the silyl ethers are so easily hydrolyzed, the only object in preparing them would be to permit isolation of the individual oligomers. Therefore, we prefer to use the monofunctional silylating agents. Furthermore, because the aryl and higher alkyl silylating agents would also have higher boiling points than the trimethylsilyl ether, we prefer to use a monofunctional silylating agent in which the silyl group is the trimethylsilyl group, e.g., trimethylsilyl halides, i.e., chloride, bromide, iodide, etc., and compounds wherein R''' in the above formula is methyl, e.g., N,N - bis(trimethylsilyl)acetamide, N - trimethylsilylacetamide, N - trimethylsilylformamide, N,N - bis(trimethylsilyl)formamide, etc.

In the same way, in making the esters, an anhydride or halide of a lower alkyl or phenyl monobasic acid is generally used to facilitate distillation to separate the individual esters of the oligomers. After isolation, however, higher alkyl or aryl esters may be made by an ester interchanging reaction. On the other hand, if the esters are to be used as a mixture, for example, as plasticizers, then no distillation of the esters is required and any anhydride or halide of a monobasic acid may be used and the mixture of esters obtained by evaporation of the solvent, but without distillation of the esters. Anhydrides and halides of polycarboxylic acids may be used in place of monobasic acids when the esters are desired as a mixture.

When the starting phenol used in the equilibration reaction is a dihydric phenol, i.e., has two hydroxyl groups, then the oligomers obtained will likewise be dihydric. These dihydric oligomers, individually or as as mixtures, may be reacted with anhydrides and halide of polybasic and especially dibasic acids, e.g., phosgene, phthalic (o,m, p) maleic, etc. anhydrides and halides, diisocyanates, etc. to produce useful polymers, e.g., polyesters, polycarbonates, copolyester-polycarbonates, polyurethanes, etc.

It is therefore seen that out equilibration reaction is a very useful tool for either decreasing the molecular weight of the polymer to obtain a new polymer having a lower molecular weight as evidenced by a decrease in intrinsic viscosity or also to prepare oligomers which would be very diffcult to obtain by ordinary synthetic organic chemistry techniques. In carrying out the reaction it is not necessary to let the reaction reach the equilibrium concentration before isolating the products of the equilibration reaction.

In order that those skilled in the art may understand our invention better, the following examples are given which are illustrative of the practice of our invention and are not intended for purposes of limitation. In the examples, all parts are by weight unless stated otherwise. Intrinsic viscosities are given as deciliter/g., measured in chloroform at 30° C. unless stated otherwise.

EXAMPLE 1

This example illustrates the equilibrium of poly-(2,6-dimethyl - 1,4 - phenylene ether) with 2,6-dimethylphenol using a diphenoquinone to produce the phenoxy radical initiator. A solution of 100 g. of poly-(2,6-dimethyl-1,5-phenylene ether), intrinsic viscosity 0.14, 100 g. of 2,6-dimethylphenol and 3.0 g. of 3,3',5,5'-tetramethyl-4,4'-diphenoquinone in 2 l. of benzene was heated with stirring at reflux for 2 hours. This solution was concentrated to 700 ml. at room temperature under vacuum on a rotary evaporator. This concentrated solution was extracted with an excess of aqueous 10% sodium hydroxide to remove as much unreacted 2,6-dimethylphenol and 3,3',5, 5'-tetramethyl-4,4'-biphenol, the reduction product of the diphenoquinone added, as possible. The organic layer was washed with 5% aqueous hydrochloric acid and then with water. Over a 30-minute period, 2 l. of methonal was added gradually to the organic layer to precipitate any polymer in the solution. After filtering off the precipitated polymer, the filtrate was concentrated to a viscous oil weighing 59 g. This oil was dissolved in 500 ml. of benzene and 100 g. of 90% pure bis(trimethylsilyl)acetamide in benzene was added. The solution was heated 2 hours to convert the oligomers to their trimethylsilyl ethers. Silyl ethers are also prepared by the use of trimethylsilylchloride in place of the bis(trimethylsilyl)acetamide. This requires the use of a hydrogen chloride acceptor, for example, hexamethyldisilazane. After evaporation of the benzene, the residual oil was fractionally distilled under reduced pressure. After the first fraction of 20 g. of the trimethylsilyl ether of 2,6-dimethylphenol was collected, the three fractions shown in Table I were obtained.

TABLE I

| Fraction | Boiling Point, °C./mm. Hg | Wt. g. | Formula of Product |
|---|---|---|---|
| A | 142/0.8 | 25 | $H{-}[{-}C_6H_2(CH_3)_2{-}O{-}]{-}Si(CH_3)_3$ |
| B | 190/0.6 | 21 | $H{-}[{-}C_6H_2(CH_3)_2{-}O{-}]{-}Si(CH_3)_3$ |
| C | 220/0.005 | 13 | $H{-}[{-}C_6H_2(CH_3)_2{-}O{-}]{-}Si(CH_3)_3$ |

The trimethylsilyl group was removed from the above materials to convert them to the corresponding phenols by dissolving 10 g. of each of the trimethylsilyl ethers in 200 ml. of methanol at room temperature and adding 1 drop of hydrochloric acid and sufficient water (ca. 100 ml.) to reach the cloud point. Upon cooling to 0° C., the free phenolic compound crystallized out of solution, except for Fraction C, which would not crystallize and was removed by filtration. The precipitate was washed with cold aqueous methanol and dried at room temperature under reduced pressure. A second batch of crystals was obtained by the addition of more water to the filtrate. The yield of the free phenolic compound from Fraction A, was 20.2 g. and the yield of the free phenolic compound from Fraction B, was 13.8 g. The free phenolic product from Fraction C, was an amorphous solid, indicating that this oligomer is of high enough molecular weight that it retains the amorphous structure of the polymer. The identity of the products of this reaction were confirmed by gas chromatography of the silyl esters and their infrared spectra compared to the same compounds prepared by the Ullman reaction.

EXAMPLE 2

This example illustrates the isolation of the oligomers as their esters rather than as the ethers as in Example 1. A solution of 1000 g. of poly-(2,6-dimethyl-1,4-phenylene ether), intrinsic viscosity of 0.2, 1000 g. of 2,6-dimethylphenol, and 30 g. of 3,3′,5,5′-tetra-methyl-4,4′-diphenoquinone in 5 l. of benzene was heated with stirring at reflux for 4 hours. To this solution, 712 g. of pyridine was added followed by the addition of 919 g. of acetic anhydride over a period of 15 minutes. The solution was thereafter heated at reflux for 2 hours, after which the benzene, pyridine and acetic anhydride were removed at reduced pressure on a rotary evaporator. This solution was first rapidly distilled at 0.1 mm. to produce 2 rough fractions of 899 g., boiling at 50 to 190° C. and 295 g. boiling at 190 to 230° C. The first fraction was fractionally distilled through a spinning band column at 0.05 mm. When the residue in the still pot contained approximately 100 g. of material, the second fraction was added and distillation continued. After collecting the fraction of 547 g. of the acetate of 2,6-dimethylphenol, three fractions were collected as shown in Table II.

TABLE II

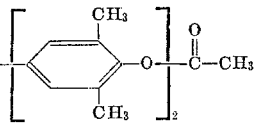

| Fraction | Boiling Point, ° C. at 0.5 mm. Hg | M.P., ° C. Recrystallized | Wt. g. | Formula of Prod. |
|---|---|---|---|---|
| A | 130 | 123–124 | 293 | |
| B | 190 | 121–122 | 220 | |
| C | 220 | 165–167 | 35 | |

These compounds were identified as in Example 1. In addition to the above compounds, a fraction weighing 22 g., identified as the diacetate of 3,3′,5,5′-tetramethylbiphenol (from the diphenoquinone), was collected between Fractions A and B, and 10 g. of a fraction, identified as the diacetate of 2,6-dimethyl-4-[2,6-dimethyl-4-(3,5-dimethyl-4-hydroxyphenyl)phenoxyl]phenol was collected between fractions B and C. In addition, about 3 g. of the acetate of the pentamer and 1 g. of the acetate of the hexamer were identified in the residue by gas chromatography.

EXAMPLE 3

This example illustrates the equilibration of a poly-(2,6-dimethyl-1,4-phenylene ether) with a phenol which is different from the phenol unit (2,6-dimethylphenoxy) of the polymer to produce oligomers in which the tail unit, i.e., the phenoxy end of the oligomer, corresponds to the phenyl used in the reaction. A solution of 100 g. of phenol ($C_6H_5OH$), 45 g. of poly-(2,6-dimethyl-1,4-phenylene ether), intrinsic viscosity 0.62, and 4.5 g. of 3,3′,5,5′-tetramethyldiphenoquinone in 500 ml. of benzene was heated at reflux for 15 minutes. The solution was concentrated at atmospheric pressure to 250 ml. over 20-minute period. The residual polymer remaining in the reaction mixture was precipitated by adding 1.5 l. of hexane. The amount of polymer recovered was 10 g. The filtrate was concentrated and trimethylsilylated as in Example 1, and fractionally distilled to give the three fractions shown in Table III.

TABLE III

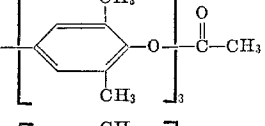

| Fraction | Boiling Point, ° C./mm. Hg | Formula of Product |
|---|---|---|
| A | 112/0.05 | |
| B | 185/0.02 | |
| C | 215/0.02 | |

After hydrolysis, as described in Example 1, the yields of the free phenolic oligomers corresponding to the above trimethylsilyl ethers were 21 g. from Fraction A, 6.5 from Fraction B and 1.0 g. from Fraction C.

EXAMPLE 4

This example illustrates the equilibration of polyphenylene ether with a wide variety of different phenols under a standard set of conditions which illustrate the difference in the activity of the various phenols as shown by the amount of recovered polyphenylene ether. Those phenols which are the most reactive show the least recovery of polyphenylene ether under the conditions used. For those phenols showing the least reactivity, longer reaction times generally will cause further equilibration. The procedure used was to make a solution of 0.5 g. of poly-(2,6-dimethyl-1,4-phenylene ether) intrinsic viscosity 0.34, and 0.0042 mole of the phenol. The phenoxy radical initiator was generated either with 15.0 mg. of 3,3′,5,5′-tetramethyl-4,4′-diphenoquinone or 50 mg. of benzoyl peroxide in 25 ml. of benzene. All solutions were heated 2 hours at reflux and then allowed to cool to 25° C. The polymer was precipitated by adding dropwise 250 ml. of methanol, filtering the solution and washing the precipitated polymer with methanol, after which it was dried at 50° C. at 10 mm. pressure for 24 hours and weighed. The amount of recovered polymer is shown in Table V.

TABLE V
Yield of Recovered Polymer as Percent of Initial Weight Used

| Phenol Used | Aryloxy Radical Generator | |
|---|---|---|
| | Benzoyl Peroxide | 3,3′,5,5′-tetramethyl-4,4′ diphenoquinone |
| Phenol | 6 | 38 |
| o-Bromophenol | 31 | 48 |
| m-Bromophenol | 28 | |
| p-Bromophenol | 11 | 24 |
| p-Iodophenol | 16 | 35 |
| p-Chlorophenol | 5 | 57 |
| 2,6-dichlorophenol | 64 | 77 |
| Pentachlorophenol | | 86 |
| o-Cresol | 3 | 4 |
| m-Cresol | 5 | 17 |
| p-Cresol | 4 | |
| 2,6-xylenol | 4 | 6 |
| Mesitol | 47 | |
| p-Methoxyphenol | 46 | |
| p-Phenoxyphenol | 4 | |
| Hydroquinone monobenzoate | | 13 |
| Resorcinol | | 33 |
| 4,4′-isopropylidenebiphenol | | 4 |
| 3,3′,5,5′-tetramethyl-4,4′-biphenol | | 60 |
| 2,6-diphenylphenol | 64 | |
| β-Naphthol | | 64 |
| p-Phenylphenol | | 53 |

The filtrate of each of the above reaction mixtures, after removing the precipitated polymer, was treated with bis(trimethylsilyl)acetamide to prepare the silyl ethers of the oligomers and analyzed by gas chromatography on a 2-foot silicone column with a program from 100° to 300° C. at 10°/minute. The amount of the corresponding dimers and trimers found in these reactions were in the same general proportion as the dimers and trimers of the preceding examples.

In a similar manner 0.5 g. of poly-(2,6-diphenyl-1,4-phenylene ether), intrinsic viscosity of 0.32, was reacted with 0.5 g. of 2,6-diphenylphenol, in dichlorobenzene solution, in one case, and with 0.37 g. of 2-phenyl-6-methylphenol in chlorobenzene solution in another case. In both cases, 3,3',5,5'-tetraphenyldiphenoquinone was used to produce the aryloxy radicals. The yield of recovered polymer was 14 and 60% respectively. The dimers, trimers and tetramers were identified after silylation of the filtrate by gas chromatography.

EXAMPLE 5

This example illustrates the use of the equilibration reaction to reduce the intrinsic viscosity of a poly(1,4-phenylene ether). A 10% solution in toluene was made from 20 pounds of poly-(2,6-dimethyl-1,4-phenylene ether), intrinsic viscosity 0.25. The solution was heated to 80° C. and 0.4 pound of 2,6-xylenol, 0.4 pound of 3,3',5,5'-tetramethyldiphenoquinone and sufficient acetic acid was added to make the solution 2 volume percent acetic acid. The solution was heated for 30 minutes at 83° C. After cooling the reaction mixture, 25 gallons of methanol was added to precipitate the polymer. After washing the filtered polymer with methanol and drying at 125° C., there was obtained 17.5 pounds of poly-(2,6-dimethyl-1,4-phenylene ether) having an intrinsic viscosity of 0.17.

EXAMPLE 6

A solution of 0.5 g. of poly-(2-methyl-6-phenyl-1,4-phenylene ether), intrinsic viscosity 0.2, 0.5 g. of 2-methyl-6-phenylphenol and 0.015 g. of 3,3',5,5'-tetramethyldiphenoquinone in 25 ml. of benzene was refluxed for 2 hours. After cooling, the solution was added dropwise with stirring to 200 ml. of methanol. The precipitated poly-(2-methyl-6-phenyl-1,4-phenylene ether) was filtered, washed with methanol and dried at 45° C. under 15 mm. Hg. pressure. The yield was 0.09 g. of polymer having an intrinsic viscosity of 0.1. After silylation of the filtrate as in Example 1, the silyl ethers of the dimer, trimer and tetramer were identified by gas chromatography.

EXAMPLE 7

This example illustrates use of a peroxide to generate the aryloxy radical as well as the production of oligomers which would be extremely difficult, if not impossible, to produce by other synthetic routes. This example also illustrates the use of a phenol different from the phenolic unit in the polyphenylene ethers. A solution of 100 g. of poly-(2,6-dimethyl-1,4-phenylene ether) having intrinsic viscosity of 0.34 dl./g. as determined in chloroform at 25° C., 144 g. of p-bromophenol and 10 g. of benzoyl peroxide in 2 l. of benzene was heated to reflux for 2 hours. At the end of this time, 223 g. of bis(trimethylsilyl)acetamide (90% pure) was added and heating continued at reflux for an additional 1 hour. At the end of this time, the reaction mixture was cooled, concentrated and distilled as described in Example 1. After distilling the trimethylsilyl ether of p-bromophenol, two fractions were collected as shown in Table IV.

TABLE IV

| Fraction | B.P., °C., 0.03 mm. Hg | Wt., g. | Formula of Product |
|---|---|---|---|
| A | 120 | 37 | Br—⟨⟩—O—⟨CH₃,CH₃⟩—O—Si(CH₃)₃ |
| B | 150 | 17 | Br—⟨⟩—O—[⟨CH₃,CH₃⟩—O]₂—Si(OH₃)₃ |

Analysis of Fraction B showed the following results with the theoretical values (in percentage) given in parentheses. C, 61.9 (62.0); H, 5.9 (6.0); Br, 16.6 (16.5); mol. wt., 475 (485).

The proton magnetic resonance spectra (PMR) of these two fractions were determined on deutrochloroform solutions at 60 megacycles using tetramethylsilane as internal standard. The peak location is reported in cycles per second (c.p.s.) and is the amount of shift from the internal standard. Relative values (R.V.) are the ratios obtained by dividing the total area under each peak by the total area corresponding to a single proton.

| C.p.s. | R.V. | Interpretation (m.e.=magnetically equivalent) |
|---|---|---|
| FRACTION A | | |
| 15 | 9 | 9 m.e. methylsilyl protons (1 m.e. trimethylsilyl group). |
| 129.5 | 6 | 6 m.e. aliphatic protons (2 m.e. CH₃— on aromatic ring). |
| 398 | 2 | 2 m.e. aryl protons. |
| 402, 411, 436, 444.5 | 4 | 2 pairs of m.e. aryl protons on the the bromophenyl ring interacting to form A₂B₂ pattern. |
| FRACTION B | | |
| 14 | 9 | 9 m.e., methylsilyl protons (1 m.e. trimethylsilyl group). |
| 125.5 | 6 | 6 m.e. aliphatic protons (2 m.e. CH₃— on an aromatic ring). |
| 128 | 6 | 6 m.e. aliphatic protons (2 m.e. CH₃— on an aromatic ring). |
| 382 | 2 | 2 m.e. aryl protons. |
| 403 | 2 | Do. |
| 408, 417.5, 440, 449 | 4 | 2 pairs m.e. aryl protons on the bromophenyl ring interacting to form an A₂B₂ pattern. |

After hydrolysis of the silyl ethers of the above 2 fractions, as described in Example 1, the free phenolic oligomers, (I) 4-(4-bromophenoxy)-2,6-dimethylphenol and, (II) 4 - [4-(4-bromophenoxy)-2,6-dimethylphenoxy]-2,6-dimethylphenol, were obtained as crystalline products. The product from Fraction A had a melting point of 62.5–63.5° C. and that from Fraction B had a melting point of 100–102° C.

Elemental analyses and PMR spectra showed that these two compounds, I from hydrolysis of Fraction A and II from hydrolysis of Fraction B, have the structural formulae:

(I)

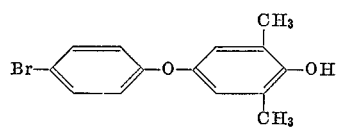

(II) 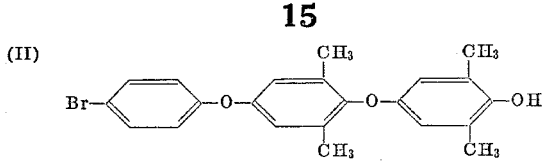

| Analyses | Found (theor.) | |
|---|---|---|
| | (I) | (II) |
| C | 57.4 (58.0) | 63.7 (63.8) |
| H | 4.5 (4.5) | 5.1 (5.1) |
| Br | 27.2 (26.4) | 18.5 (19.3) |
| Mol. wt | 285 (293) | 392 (413) |

PMR spectra obtained on solutions in deutrodimethylsulfoxide [(CD$_3$)$_2$SO], tetramethylsilane, internal standard.

| C.p.s. | R.V. | Interpretation |
|---|---|---|
| | | COMPOUND 1 |
| 132 | 6 | 6 m.e. aliphatic protons (2 m.e. CH$_3$— on an aromatic ring. |
| 270 | 1 | 1 hydroxylic proton. |
| 399 | 2 | 2 m.e. aryl protons—phenol ring. |
| 402<br>411<br>436<br>445 | 4 | 2 pairs of m.e. aryl protons on bromophenyl ring interacting to produce an A$_2$B$_2$ pattern. |
| | | COMPOUND 2 |
| 122 | 6 | 6 m.e. aliphatic protons (2 m.e. CH$_3$— on an aromatic ring). |
| 125 | 6 | 6 m.e. aliphatic protons (2 m.e. CH$_3$— on an aromatic ring). |
| 200 | 1 | 1 hydroxylic proton. |
| 380 | 2 | 2 m.e. aryl protons. |
| 410 | 2 | Do. |
| 414<br>425<br>448<br>457 | 4 | 2 pairs of m.e. aryl protons on bromophenyl ring interacting to produce an A$_2$B$_2$ pattern. |

These two products are new chemical compounds which would be difficult, if not impossible, to produce by any other means, for example, by the Ullmann reaction. These compounds are disclosed and claimed in an application of White, Ser. No. 547,182, now U.S. Patent 3,367,978, filed concurrently herewith and assigned to the same assignee as the present invention. Although it would be possible to produce 4-phenoxy-2,6-dimethylphenol by the Ullmann reaction from the methyl ether of 2,6-dimethyl-4-bromophenol and sodium phenate, the substitution of sodium p-bromophenate for sodium phenate would result in side reactions occurring because the sodium p-bromophenate would react with itself. Attempts to brominate 4-phenoxy-2,6-dimethylphenol leads to bromination in both meta-positions of the phenyl ring having the methyl groups as well as the ortho- and para-positions of the phenoxy group in the 4-position.

The still pot residue from the distillation of the silyl ethers was shown by thin layer of chromatography to contain the silyl ethers of high oligomers, for example, the tetramers, pentamers, etc. However, their boiling points were so high that they could not be distilled without thermal decomposition.

EXAMPLE 8

This example illustrates the equilibrium reaction wherein a dihydric phenol is used in the equilibration reaction. A mixture of 100 g. of 3,3',5,5'-tetramethyl-4,4'-biphenol, 15 g. of 3,3',5,5'-tetramethyl-4,4'-diphenoquinone and 2 l. of benzene was heated to 80° C. To this mixture was added 50 g. of poly-(2,6-dimethyl-1,4-phenylene ether) having intrinsic viscosity of 0.27 dl./g. measured in chloroform at 25° C. After heating for 16 hours at reflux, gas chromatographic analysis indicated the presence of 30 g. of dimer. At this point 204 g. of bis(trimethylsilyl)-acetamide (90% pure), was added dropwise. After 2 hours of heating at reflux, the mixture was concentrated and distilled at reduced pressure as described in Example 1. After distilling the silyl ether of the starting biphenol, there was obtained 40 g. of the bis(trimethylsilyl) ether of the dimer boiling at 190° C. at 0.01 mm./Hg. This product has the formula:

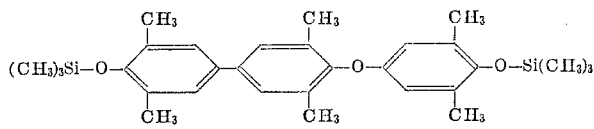

Hydrolysis of this fraction, as described in Example 1, yielded the free phenolic product as a crystalline solid having a melting point of 201.5–202.5° C. Infrared and PMR spectra as well as elemental analysis and gas chromatography confirmed that this product had the structural formula:

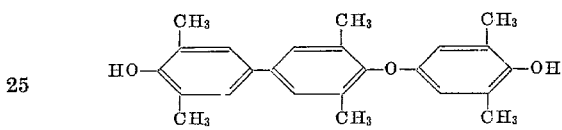

This is a new chemical compound and is claimed in the above-identified application of D. M. White. Elemental analysis showed the following results with the theoretical values (in percentage) given in parentheses. C, 79.3 (79.6); H, 7.3 (7.2); mol. wt., 359 (362).

The PMR spectrum of a solution in deutrodimethylsulfoxide, tetramethylsilane internal standard showed:

| C.p.s. | R.V. | Interpretation |
|---|---|---|
| 123 | 12 | 12 m.e. aliphatic protons (4 CH$_3$— on the biphenyl ring). |
| 132 | 6 | 6 m.e. aliphatic protons (2 CH$_3$— on the phenol ring). |
| 376 | 2 | 2 m.e. aryl protons. |
| 429 | 2 | Do. |
| 435 | 2 | Do. |
| 462 | 1 | 1 hydroxylic proton. |
| 491 | 1 | Do. |

EXAMPLE 9

This example also illustrates the equilibration of poly-(2,6-dimethyl-1,4-phenylene ether) with a dihydric phenol. A solution of 40 g. of 4,4'-isopropylidenediphenol, 20 g. of poly-(2,6-dimethyl-1,4-phenylene ether), intrinsic viscosity 0.11 and 0.6 g. of 3,3',5,5'-tetramethyl-4,4'-diphenoquinone in 600 ml. of benzene was heated for two hours at 80° C. At the end of this time, 64 g. of bis(trimethylsilyl)acetamide (90% pure) was added. Heating at 80° C. was continued for one hour. The mixture was concentrated and distilled under reduced pressure as described in Example 1. After collecting 46 g. of the bis-(trimethylsilyl) ether of 4,4'-isopropylidenediphenol, boiling point 130° C. at 0.01 mm. Hg pressure, there was obtained 22 g. of the bis(trimethylsilyl) ether of the desired product boiling at 212° C. at 0.01 mm. Hg pressure. Elemental analysis and the PMR spectrum showed that this product had the structural formula:

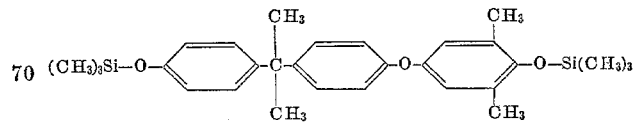

*Analyses.*—C (percent), 70.7 (70.7); H (percent), 8.2 (8.1).

The PMR spectrum of a solution in carbon tetrachloride (tetramethylsilane, internal standard) showed:

| C.p.s. | R.V. | Interpretation |
| --- | --- | --- |
| 14 | 18 | 18 aliphatic protons (6 $CH_3$— on 2 silicone. atoms, i.e., two trimethylsilyl groups). |
| 97 | 6 | 6 m.e. aliphatic protons (2 $CH_3$— on an aromatic ring). |
| 129 | 6 | Do. |
| 395 | 2 | 1 pair m.e. aryl protons. |
| 392, 399, 401, 408, 417, 420, 426, 429 | 8 | 1 set of 2 pairs of m.e. aryl protons interacting to produce an $A_2B_2$ pattern. |

The trimethylsilyl groups were removed by dissolving 1 g. of the above bis(trimethylsilyl) ether in 25 ml. of methanol and adding one drop of concentrated aqueous HCl. The solution was evaporated to dryness at ambient temperature under reduced pressure. The crystals so obtained were recrystallized from a benzene-hexane solution to obtain a product melting at 118–119° C. Elemental analysis and the PMR spectrum showed that this material had the structural formula:

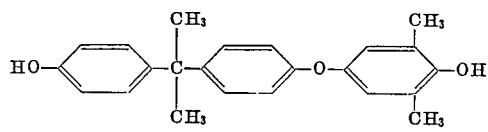

Analysis.—C (percent), 79.2 (79.3); H (percent), 6.9 (6.9); mol Wt., 337 (348).

The PMR spectrum of a solution in deuterochloroform (tetramethylsilane, internal standard) showed:

| C.p.s. | R.V. | Interpretation |
| --- | --- | --- |
| 97 | 6 | 6 m.e. aliphatic protons (2 m.e. $CH_3$— on aliphatic carbon). |
| 131 | 6 | 6 m.e. aliphatic protons (2 m.e. $CH_3$— on aromatic ring). |
| 280 | 1 | 1 m.e. hydroxylic proton. |
| 312, | 1 | Do. |
| 397, 401*, 404, 406, 413, 421, 423, 430, 432 | 10 | 1 set of 2 pairs of m.e. aryl protons interacting to produce an $A_2B_2$ pattern. 1 pair of m.e. aryl protons. |

* In view of PMR spectra of the bis(trimethylsilyl) ether this value is probably that of the 1 pair of m.e. aryl protons which do not interact to produce an $A_2B_2$ pattern.

This is a new compound and is disclosed and claimed in the above-identified White application.

The still pot residue from distillation of the silyl ether when analyzed by thin layer chromatography and gas chromatography shows the presence of the higher oligomers, e.g., the trimer, tetramer, pentamer, etc. However, their boiling points are so high that they can not be distilled without thermal decomposition. The mixture of these oligomers can be converted to a mixture of the corresponding free phenols by hydrolysis and the mixture used for making polyesters, polycarbonates, polyurethanes, etc., in the same manner as the isolated free dihydric phenol of this example.

In addition to the above equilibration reactions, we have likewise carried out the equilibration reactions at room temperature, but such equlibration reactions require a matter of days rather than hours used above. Likewise, we have also carried out the equilibration reactions wherein the phenoxy radicals were generated by irradiation of the solution of phenol and polymer with both ultraviolet light as well as visible light, at room temperature. Such equilibration reaction are likewise quite slow and require several days of continuous irradiation, in the presence of air as compared to the above examples, which can be carried out in a matter of hours.

The oligomers produced by our process have a wide variety of uses. As illustrated above, they may be isolated as esters which are useful as plasticizers and as the free oligomers. The free oligomers may be converted into chemical derivatives such as thyroxine analogs for the dimer oligomer, especially those dimer oligomers in which the terminal phenoxy group has a halogen, for example, bromine in a para-position. As mentioned previously, they may be converted to polyesters, polycarbonates, polyurethanes, etc. Furthermore, these oligomers may be added to the polymerization reaction wherein phenols are oxidatively coupled to a high polymer to act as modifiers of the polymer so obtained. The polymers which are produced by our process have the usual properties of polymers and may be fabricated into films and molded objects. They may, likewise, be blended with the polyphenylene ethers produced by an oxidative coupling reaction to produce blends of the polymers to modify the molding and flow characteristics thereof.

In the foregoing examples, various modifications have been disclosed. Obviously, other modifications and variations of the present invention are possible in the light of the above teachings. It is, therefore, to be understood that changes may be made in the particular embodiments of the invention described which are within the full intended scope of the invention as defined by the appended claims.

What we claim as new and desire to secure by Letters Patent of the United States is:

1. The process of equilibrating poly-(1,4-phenylene ethers) with phenols which comprises reacting (1) a poly-(1,4-phenylene ether) have the formula:

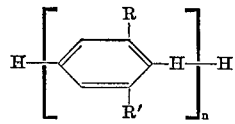

where $n$ is an integer and is at least 10, R is selected from the group consisting of $C_{1-8}$ alkyl free of an aliphatic tertiary α-carbon atom, and phenyl and R' is the same as R and in addition, biphenylyl, terphenylyl and naphthyl with (2) a phenol selected from the group consisting of phenols having one of the formulae:

(a)

(b)

and (c)

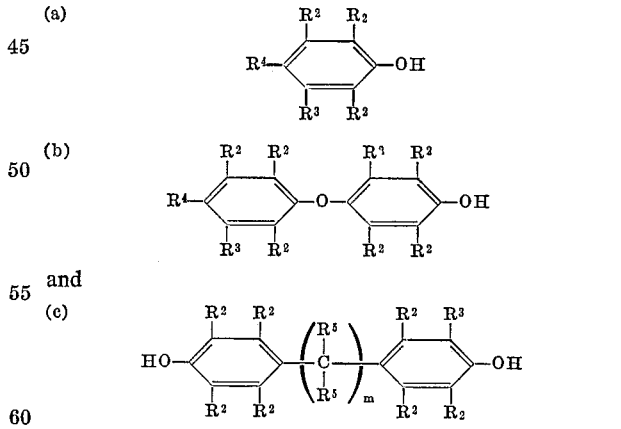

where $m$ is one of the numbers 0 and 1, each $R^2$ is independently selected from the group consisting of hydrogen, $C_{1-8}$ alkyl free of an aliphatic, tertiary α-carbon atom, phenyl and halogen, $R^3$ is the same as $R^2$ and in addition, hydroxyl, $R^4$ is selected from the group consisting of hydrogen, $C_{1-8}$ alkyl, $C_{1-8}$ alkoxy, $C_{1-8}$ acyl, and phenyl, and in addition halogen when each $R^2$ on the same benzene ring as $R^4$, is one of the members cosisting of hydrogen and halogen, and $R^5$ is selected from the group consisting of hydrogen, methyl, ethyl and phenyl, said reaction being initiated by an aryloxy radical selected from the group consisting of the phenoxy radical of the polyphenylene ether of (1) and the phenoxy radical of the phenol of (2) and mixtures thereof, said reaction being carried out at a temperature in the range from room temperature up to the reflux temperature of the reaction mixture whereby the said polyphenylene ether is converted to lower molecular weight derivatives.

2. The process of claim 1 wherein the initial reaction between the said phenol and said poly-(1,4-phenylene ether) is carried out with a sufficient amount of the phenol that the predominant equilibrated products are oligomers of the starting poly-(1,4-phenylene ethers), any residual polymer is separated from the reaction mixture, the remaining oligomeric products are reacted with a member of the group consisting of monofunctional silylating agents, monofunctional acyl halides and monofunctional acyl ahydrides and thereafter the corresponding derivatives of the oligomers so produced are separated from the reaction mixture.

3. The process of claim 2 wherein the oligomeric products are reacted with a monofunctional silylating agent.

4. The process of claim 2 wherein the value of $n$ in the formula of the starting polyphenylene ether is 10–100.

5. The process of reducing the intrinsic viscosity of a poly-(1,4-phenylene ether) which comprises reacting (1) a poly-(1,4-phenylene ether) having the formula:

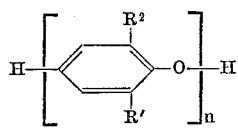

where $n$ is an integer and is at least 10, R is selected from the group consisting of $C_{1-8}$ alkyl free of an aliphatic, tertiary α-carbon atom, and phenyl and R' is the same as R and in addition, biphenylyl, terphenylyl and naphthyl with (2) a phenol selected from the group consisting of phenols having one of the formulae:

(a)

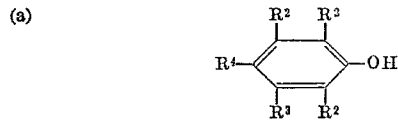

(b)

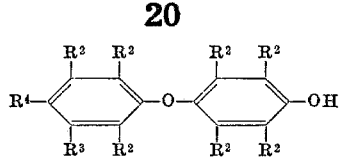

(c)

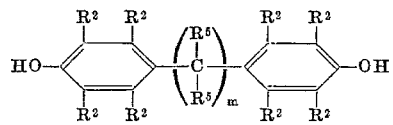

where $m$ is one of the numbers 0 and 1, each $R^2$ is independently selected from the group consisting of hydrogen, $C_{1-8}$ alkyl free of an aliphatic, tertiary α-carbon atom, phenyl and halogen, $R^3$ is the same as $R^2$ and in addition, hydroxyl, $R^4$ is selected from the group consisting of hydrogen, $C_{1-8}$ alkyl, $C_{1-8}$ alkoxy, $C_{1-8}$ acyl, and phenyl, and in addition halogen when each $R^2$ on the same benzene ring as $R^4$, is one of the members consisting of hydrogen and halogen, and $R^5$ is selected from the group consisting of hydrogen, methyl, ethyl and phenyl, said reaction being initiated by an aryloxy radical selected from the group consisting of the phenoxy radical of the polyphenylene ether of (1) and the phenoxy radical of the phenol of (2) and mixtures thereof, said reaction being carried out at a temperature in the range from room temperature up to the reflux temperature of the reaction mixture and thereafter precipitating the poly-(1,4-phenylene ether) from the reaction mixture.

6. The process of claim 5 wherein the poly(1,4-phenylene ether) is poly-(2,6-dimethyl-1,4 phenylene ether).

7. The process of claim 5 wherein the poly-(1,4-phenylene ether) is poly-(2,6-dimethyl - 1,4 - phenylene ether) and the phenol is 2,6-xylenol.

References Cited

UNITED STATES PATENTS

| | | | |
|---|---|---|---|
| 3,220,979 | 11/1965 | McNelis | 260—613 XR |
| 3,362,934 | 1/1968 | Bolon | 260—613 XR |

FOREIGN PATENTS 930,993  7/1963  Great Britain.

BERNARD HELFIN, Primary Examiner

U.S. Cl. X.R.

204—158; 260—47, 448.2, 476, 487, 491

UNITED STATES PATENT OFFICE
CERTIFICATE OF CORRECTION

Patent No. 3,496,236          Dated February 17, 1970

Inventor(s) Glenn D. Cooper and Alfred R. Gilbert

It is certified that error appears in the above-identified patent and that said Letters Patent are hereby corrected as shown below:

Column 10, TABLE I, that portion of the formula for the three fractions reading $-[-O-]-Si$ should read $-[-O-]_2-Si$ for fraction A, $-[-O-]_3-Si$ for fraction B and $-[-O-]_4-Si$ for fraction C.

Column 14, TABLE IV, that portion of the formula for Fraction B reading $-Si(OH_3)_3$ should read $-Si(CH_3)_3$ Column 18, lines 32 to 37, that portion of the formula reading $-[-H-]_n-H$ should read $-[-O-]_n-H$ Column 19, line 13, after "anhydrides" insert - to produce the corresponding ether or ester derivatives of said oligomers - line 15, after "mixture" and before the period (.) - and hydrolyzed to regenerate the oligomers Column 20, line 31, insert a hyphen (-) between "4" and "phenylene

SIGNED AND
SEALED
AUG 25 1970

(SEAL)
Attest:

Edward M. Fletcher, Jr.
Attesting Officer

WILLIAM E. SCHUYLER, JR.
Commissioner of Patents